(12) United States Patent
Huang (10) Patent No.: US 7,196,616 B2
(45) Date of Patent: Mar. 27, 2007

(54) TIRE PRESSURE WARNING DEVICE WITH ADJUSTABLE TIRE PRESSURE SETTING

(76) Inventor: Tien-Tsai Huang, No.4-2, Lane 30, Wu Chyuan St., Pan-Chiao, Taipei (TW)

( * ) Notice: Subject to any disclaimer, the term of this patent is extended or adjusted under 35 U.S.C. 154(b) by 230 days.

(21) Appl. No.: 11/069,516

(22) Filed: Feb. 28, 2005

(65) Prior Publication Data
US 2006/0191466 A1   Aug. 31, 2006

(51) Int. Cl.
B60C 23/00 (2006.01)
B60C 23/02 (2006.01)
(52) U.S. Cl. .............. 340/442; 116/34 B; 116/34 R; 73/146
(58) Field of Classification Search ............. 340/442, 340/443, 691.1, 691.6; 116/34 B, 34 R; 73/146, 146.3, 146.5, 146.8
See application file for complete search history.

(56) References Cited

U.S. PATENT DOCUMENTS

| | | | | |
|---|---|---|---|---|
| 3,859,849 A | * | 1/1975 | Novak | 73/146.8 |
| 4,425,558 A | * | 1/1984 | McConchie | 340/446 |
| 4,869,306 A | * | 9/1989 | Keys | 152/427 |
| 5,040,561 A | * | 8/1991 | Achterholt | 137/227 |
| 5,581,023 A | * | 12/1996 | Handfield et al. | 73/146.5 |
| 5,929,330 A | * | 7/1999 | Ford | 73/146.8 |
| 6,006,600 A | * | 12/1999 | Cheng | 73/146.5 |
| 7,032,611 B1 | * | 4/2006 | Sheng | 137/225 |

* cited by examiner

Primary Examiner—Toan N. Pham
(74) Attorney, Agent, or Firm—Pro-Techtor Int'l Services (57) ABSTRACT

A tire pressure warning device with adjustable pressure setting includes a case divided into a lower and an upper chamber and having a shoulder portion formed near a top thereof; a valve structure mounted in the lower chamber of the case; a membrane, a bushing, a push member, an elastic element, and a pressure-adjusting element sequentially mounted in the upper chamber of the case; and a cover connected to the top of the case. While the elastic element defines a basic pressure setting for the device to measure the air pressure inside a specific type of tire, a pressure-adjusting element with a suitable thickness may be selected to adjust the tightness of an elastic fixing element and thereby changes the pressure setting for the device, so that the device could also be used to measure the tire pressure of other different types of tires.

18 Claims, 9 Drawing Sheets

TIRE PRESSURE WARNING DEVICE WITH ADJUSTABLE TIRE PRESSURE SETTING

FIELD OF THE INVENTION

The present invention relates to a tire pressure warning device, and more particularly to a tire pressure warning device that allows adjustment of a tire pressure setting thereof with a widened scope of application for the device.

BACKGROUND OF THE INVENTION

Tires for each specific type of vehicle must have a normal internal pressure corresponding to that specific type of vehicle. In the event the internal pressure of a tire (that is, the tire pressure) is too low, it would have adverse influences on the safety in driving. In addition, due to the rotation of tire at high speed and the degraded air tightness of the tire valve, air inside the tire tends to leak gradually after the tire has been used over a long time, which results in insufficient tire pressure and thus adversely affects the safety in driving. Therefore, different types of tire pressure indicating devices have been developed to indicate tire pressure and warn the user when an insufficient tire pressure takes place.

Taiwanese New Utility Model Patent Publication. No. 186905 discloses a tire pressure warning device including a housing having a pressure-bearing membrane mounted therein; a push rod located above the pressure-bearing membrane; a compression spring providing the push rod with a restoring force; and a warning means. The warning means includes a first switch, which is a normally closed switch located above the push rod; a second switch, which is a normally open switch located above and electrically connected to the first switch; an emitter located between the push rod and the second switch and electrically connected to the first and the second switches; and a receiver provided at a location in sight of a driver. The internal pressure of a tire being detected actuates either the first or the second switch of the tire pressure warning device, making the emitter to emit a signal to the receiver and the tire pressure being displayed on the receiver.

Taiwanese New Utility Model Patent Publication No. 529559 discloses a membrane-type tire pressure gauge including a housing, a flexible membrane located in a receiving chamber of the housing, a push rod associated with the flexible membrane to move along with the flexible membrane, an inner sleeve also located in the receiving chamber of the housing, and a spring. The membrane-type tire pressure gauge is fixedly mounted to a tire valve to indicate the internal pressure of the tire.

Taiwanese New Utility Model Patent Publication No. 574977 discloses a tire pressure warning device including a connecting body having a cap screwed thereto. The connecting body is integrally molded and includes a connecting seat made of an electrically conductive material and a sleeve seat made of an electrically non-conductive material. The cap is screwed to the sleeve seat. The connecting body and the cap together define between them an inner space, in which emitting means and power supply means are provided. A conducting element, a pressure switch having a first contact and a second contact formed from a movable seat controlled by a membrane, an adjusting element, an elastic element located between the adjusting element and the movable seat, a first circuit connecting the first contact to the emitting means, and a second circuit connecting the second contact to the emitting means are provided between the emitting means and the power supply means. The connecting seat includes a connecting head separated by a separator with operating holes, and a conductor portion integrally formed on the connecting head. The sleeve seat includes a curtain portion enclosing an outer periphery of the connecting head when the sleeve seat is molded, and a seat body enclosing the conductor portion. The seat body is internally provided at one side opposite to the conductor portion with a fine adjustment space and a sliding space. The seat body is provided, at the fine adjustment space, with internal threads for an adjusting element to screw thereto, and that the seat body is provided, at the sliding space, with a round inner wall surface for the movable seat to slide upward and downward therein. The movable seat slides upward or downward depending on the pressure of the tire, so as to touch with or separate from the connecting seat and thereby electrically connects or disconnects a conducting circuit of the tire pressure warning device to achieve the warning function when an insufficient tire pressure takes place.

All the above-mentioned and other prior patents in connection with tire pressure measuring devices or tire pressure warning devices include an elastic element (spring) as the element to resist the internal pressure of the tire. That is, the elasticity of the elastic element is used to determine the pressure setting for measuring the tire pressure. Therefore, once an elastic element with a specific elasticity is selected for use, the pressure setting for measuring the tire pressure is determined. Since the pressure setting for measuring tire pressure determined in the above manner could not be arbitrarily adjusted once it is determined, the above-mentioned and other conventional tire pressure warning devices with such fixed pressure setting could be used with only one type of vehicle for which the tire pressure warning devices are particularly designed. For other types of vehicles or tires that require different pressure settings, users must expend more money to purchase additional tire pressure warning devices with corresponding pressure settings therefor.

The inventor therefore endeavors to develop a tire pressure warning device with adjustable pressure setting to overcome the drawbacks existed in conventional tire pressure warning devices.

SUMMARY OF THE INVENTION

A primary object of the present invention is to provide a tire pressure warning device with adjustable tire pressure setting, wich can be used to measure or detect the tire pressure of different types of tires. The meaning of "to measure the tire pressure" indicates that the air pressure in the tire makes the "tire pressure warning device" reveal "the status of the tire pressure" and thus can be observed externally. The meaning of "to detect the tire pressure" indicates that the air pressure in the tire makes the "tire pressure warning device" emit an electronic signal regarding "the status of the tire pressure," and such electronic signal is received by a receiver in sight of a driver who thus notices "the status of the tire pressure."

To achieve the above and other objects, the tire pressure warning device with adjustable tire pressure setting according to the present invention includes a casing, an inner space which is divided into an upper and a lower chambers by an internal transverse partition having a central hole where the casing is provided, at the upper chamber near a top thereof, with an annular shoulder portion; a valve structure mounted in the lower chamber of the casing; a membrane mounted on a top of the transverse partition; a bushing, which is mounted in the upper chamber of the casing and is located above an annular outer peripheral portion of the membrane, and is provided at a top with a through hole; a push member, which includes a push bar located in the bushing with a lower end thereof pressed against the membrane and an upper end upward projected from the through hole of the bushing, and the push bar is formed near the lower end with a radially extended flange; an elastic element mounted around the push bar of the push member and being located between the flange of the push bar and the top of the bushing; a pressure-adjusting element mounted on a top of the push member; a cover, which is provided at an appropriate position with a through hole and which is mounted around the top of the casing; and an elastic fixing element for elastically locating the pressure-adjusting element between the push member and the cover. When one or a certain number of the pressure-adjusting element with the same or different thickness is selected to be placed on the top of the push member and thereby adjusting the stiffness of the elastic fixing element, the pressure setting for the tire pressure warning device may be changed. This allows the same tire pressure warning device to have a widened scope of application for measuring the internal pressure of different types of tires.

In another embodiment of the present invention, the tire pressure warning device further includes a battery and a circuit board having an emitter mounted thereon to wirelessly emit a pressure signal to a receiver. The receiver is located in sight of a driver to show a warning signal in response to the received pressure signal.

In a further embodiment of the present invention, the tire pressure warning device further includes a battery and a circuit board having a sound and flash warning means mounted thereon to produce sound and/or flashes as a warning signal of insufficient tire pressure.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
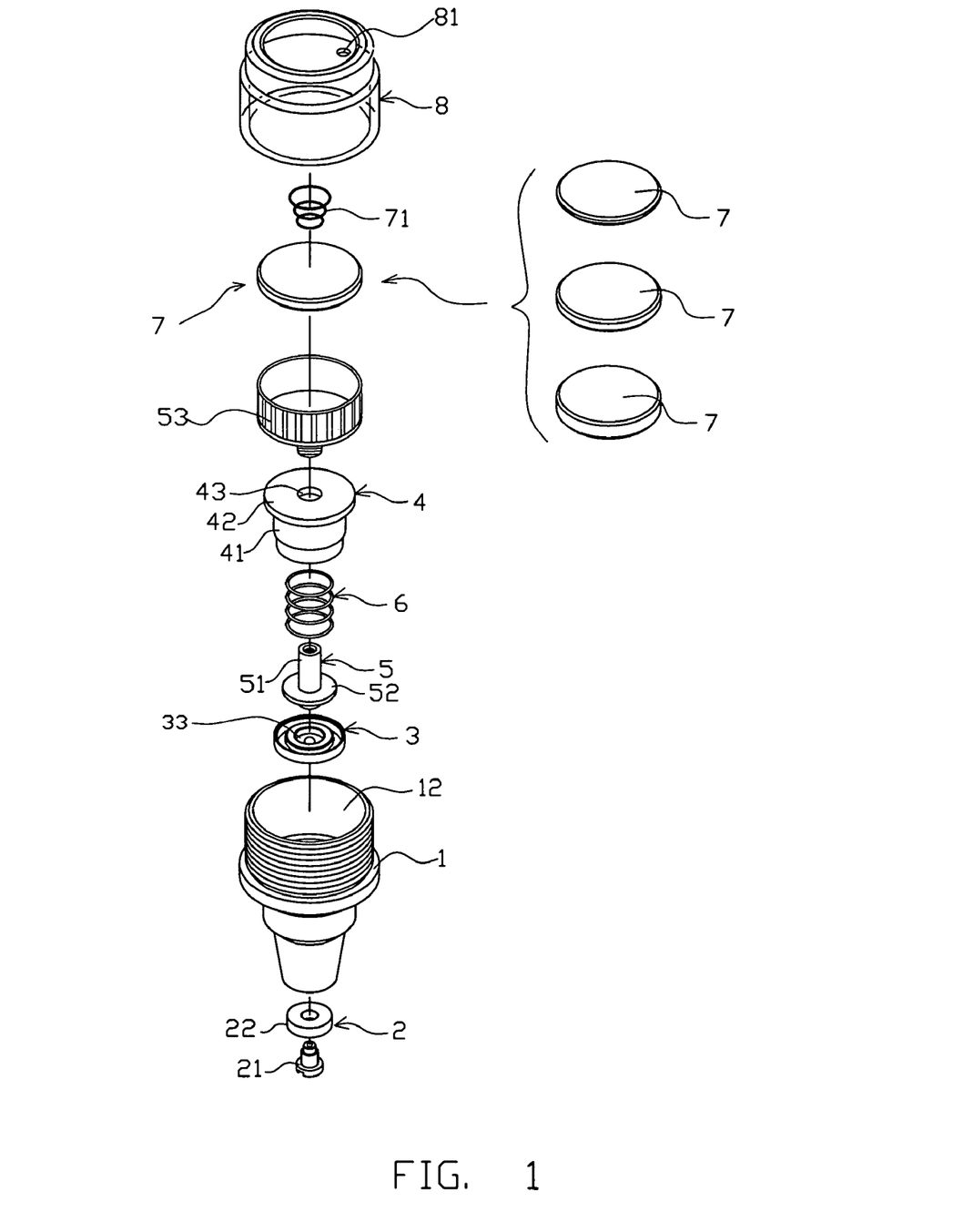
FIG. 1 is an exploded perspective view of a tire pressure warning device with adjustable tire pressure setting according to a first embodiment of the present invention.
Figure 2:
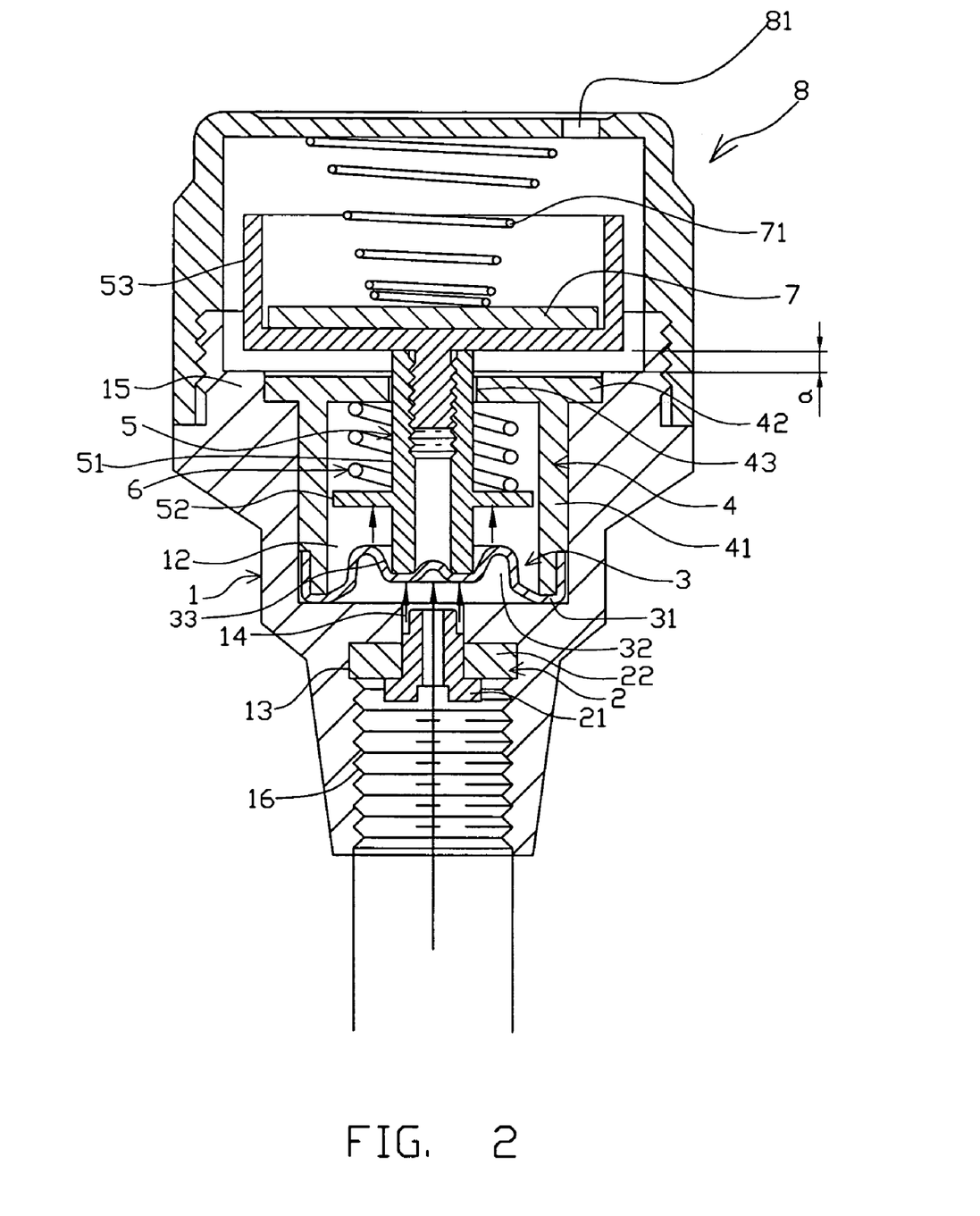
FIG. 2 is an assembled sectional view of the tire pressure warning device of FIG. 1 connected to a tire having a normal tire pressure.
Figure 3:
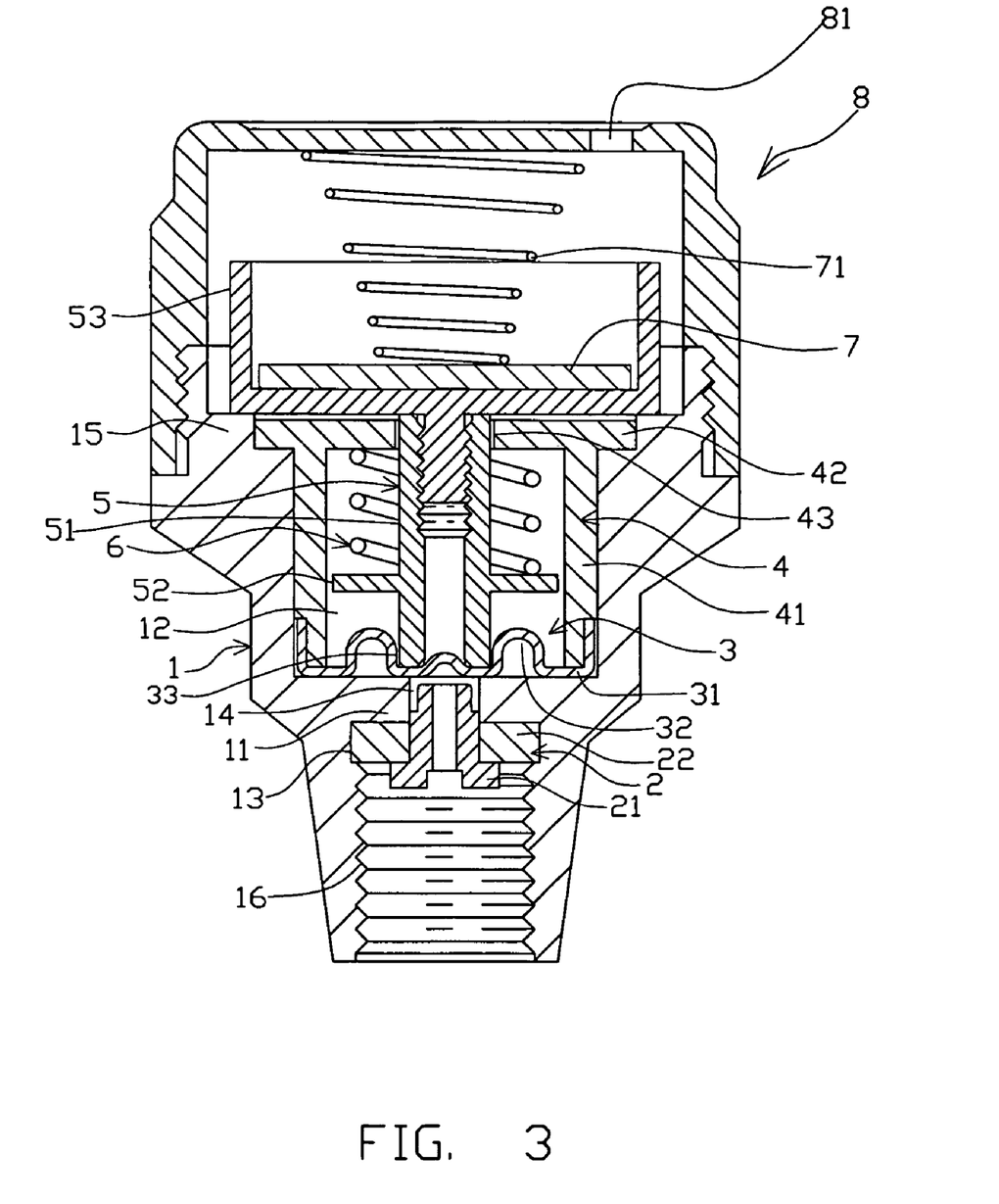
FIG. 3 is an assembled sectional view of the tire pressure warning device of FIG. 1 connected to a tire having an insufficient tire pressure.

Please refer to FIG. 1 that is an exploded perspective view of a tire pressure warning device with adjustable tire pressure setting according to a first embodiment of the present invention, and to FIGS. 2 and 3 that are assembled sectional views of the tire pressure warning device of FIG. 1 connected to tires having normal and insufficient tire pressures, respectively. For the purpose of concision, the present invention is also briefly referred to as the tire pressure warning device throughout the specification of the present invention.

As shown, the tire pressure warning device of the present invention mainly includes a casing 1, a valve structure 2, a membrane 3, a bushing 4, a push member 5, an elastic element 6, at least a pressure-adjusting element 7, an elastic fixing element 71, and a cover 8.

The casing 1 is internally provided with a transverse partition 11, having a central hole 14, to divide an inner space of the casing 1 into an upper chamber 12 and a lower chamber 13, and the casing 1 is provided, at the upper chamber 12, near a top thereof with an annular shoulder portion 15.

The valve structure 2 is mounted in the lower chamber 13 of the casing 1, and includes a valve 21 having a top upward projected into and fixedly received in the central hole 14 of the transverse partition 11 in the casing 1, and a rubber washer 22 mounted around the valve 21. The casing 1 is provided, at the lower chamber 13 of the casing 1, with internal threads 16 for screwing the tire pressure warning device to a valve (not shown) of a tire, such that the valve of the tire is pushed open by the valve structure 2, and air inside the tire is guided via the valve structure 2 into the upper chamber 12 of the casing 1.

The membrane 3 is mounted on a top of the transverse partition 11 of the casing 1, and is integrally molded to include an annular outer peripheral portion 31 and a deformable circular inner portion 32 surrounded by the outer peripheral portion 31. The circular inner portion 32 of the membrane 3 is upward deformable under the air pressure of the tire, and has a corrugated cross section to allow an increased extent of deformation thereof. A central area of the circular inner portion 32 of the membrane 3 is formed with an annular recess portion 33 for supporting the lower end of a push bar 51 of the push member 5.

The bushing 4 is mounted in the upper chamber 13 of the casing 1 and is located above the annular outer peripheral portion 31 of the membrane 3, and includes a cylindrical body 41 and a flat top plate 42 having a central through hole 43 and located at a top of the cylindrical body 41. The cylindrical body 41 of the bushing 4 has a lower end configured to match a profile of the annular outer peripheral portion 31 of the membrane 3, such that the cylindrical body 41 of the bushing 4 is adapted to firmly press at the lower end against the annular outer peripheral portion 31 of the membrane 3 and thereby holds the latter in place, and only the circular inner portion 32 of the membrane 3 is allowed to deform and shift upward under the air pressure of the tire or shift downward when the air pressure of the tire is removed.

The push member 5 is mounted in the bushing 4 and includes a push bar 51, a lower end of which is pressed against the deformable circular inner portion 32 of the membrane 3. In a preferred embodiment, the push bar 51 is a tubular member having a lower end pressed against the annular recess portion 33 at the center of the deformable circular inner portion 32 of the membrane 3 to move upward and downward along with the deformable circular inner portion 32. The push bar 51 has an upper end upward projected from the central through hole 43 of the bushing 4, and is provided near the lower end with a radially extended flange 52 to support the elastic element 6 thereon. The push bar 51 and the flange 52 can be integrally made as one piece, or separately made and combined into one piece.

A color circle 53 is assembled to the top of the push bar 51 of the push member 5 to normally rest on the shoulder portion 15 of the casing 1. A warning color is applied over an outer surface of the color circle 53 so that a user can know from an exterior of the casing 1 whether the tire has sufficient tire pressure or not. The color circle 53 has a stem portion downward extended from the bottom thereof to couple the color circle 53 with the tubular push bar 51. In a preferred embodiment, the color circle 53 is assembled to the push bar 51 by riveting or screwing the stem portion of the color circle 53 to the top of the push bar 51. In the illustrated first embodiment, the color circle 53 is screwed to the push bar 51.

The elastic element 6 is mounted around the push bar 51 of the push member 5 and is located between the flange 52 of the push member 5 and the top plate 42 of the bushing 4, so as to produce a restoring force during elastically resisting the air pressure inside the tire. When the tire pressure of the tire is normal and overcomes the elasticity of the elastic element 6, the circular inner portion 32 of the membrane 3 is upward pushed and deformed by the tire pressure, and thereby pushes the push member 5 upward. Reversely, when the tire pressure is insufficient and the elasticity of the elastic element 6 prevails, the push member 5 keeps at a low position in the bushing 4 with the bottom of the color circle 53 in contact with the shoulder portion 15 of the casing 1.

The pressure-adjusting element 7 is mounted on the top of the push member 5. In practical use of the present invention, the pressure-adjusting element 7 is mounted between and in contact with the color circle 53 and the elastic fixing element 71, while the top of the elastic fixing element 71 is upward pressed against the cover 8. Alternatively, the pressure-adjusting element 7 may be mounted between and in contact with the cover 8 and the elastic fixing element 71, while the bottom of the elastic fixing element 71 is downward pressed against the color circle 53. The elastic element 7 is an elastic body, and may be, for example, a coil spring or a leaf spring.

A plurality of pressure-adjusting elements 7 having the same or different thickness are prepared to correspondingly adjust the stiffness of the elastic fixing element 71. Each of the pressure-adjusting elements 7 is marked to show the pressure value corresponding to the thickness of the particular pressure-adjusting element 7, such as +2 psi, +4 psi, +6 psi, etc. where for example, the pressure-adjusting element 7 marked as +6 psi can be a single piece or accumulated with three pieces of the pressure-adjusting elements marked as +2 psi. As mentioned above, when the tire pressure of the tire is sufficient, it would overcome the elasticity of the elastic element 6 and push the push member 5 upward. And, when a pressure-adjusting element 7 of +2 psi, for example, is selected and positioned above the push member 5, the initial setting value of elasticity of the elastic element 6 could be increased. That is, the pressure setting of the tire pressure warning device is adjustable by using pressure-adjusting elements 7, allowing a user to use the same tire pressure warning device to measure tire pressure of different types of tires.

The cover 8 is provided with a through hole 81, so that the pressure inside the cover 8 is the same as external pressure. The through hole 81 may be of any shape and formed at any position on the cover 8. The cover 8 is removably mounted around the top of the casing 1 to enclose and secure the above-mentioned components of the tire pressure warning device in the casing 1. The cover 8 is made of a transparent material for a user to observe from outside of the cover 8 the upward or downward movement of the color circle 53 at the top of the push member 5, and thereby determine whether the internal pressure of the tire is sufficient or not.

Before using the tire pressure warning device of the present invention, first select a pressure-adjusting element 7 having a thickness according to a pressure setting required by the tire, and position the selected pressure-adjusting element 7 on the top of the push member 5 so as to increase the setting value of elasticity of the elastic element 6 to an extent matching the required pressure setting of the tire. In this manner, the tire pressure warning device of the present invention could be adjusted to different pressure settings depending on the types of tires.

To use the tire pressure warning device of the present invention, first screwing the internal threads 16 in the lower chamber 13 of the casing 1 to the valve on a tire, so that the valve of the tire is pushed open by the valve structure 2 in the casing 1 to allow the air inside the tire to flow via the valve structure 2 into the upper chamber 12 of the casing 1. When the air pressure inside the tire is sufficient and in a normal condition, the circular inner portion 32 of the membrane 3 is caused to protrude upward and deform, and thereby upward pushes the color circle 53 and the pressure-adjusting element 7 on the top of the push member 5, as shown in FIG. 2. At this point, the color circle 53 is lifted up from contacting the shoulder portion 15 of the casing 1 and could be observed from outside of the transparent cover 8 to determine whether the measured tire pressure is normal or not.

On the other hand, when the air pressure inside the tire is insufficient to resist the pressure setting determined via the elasticity of the elastic element 6 and of the elastic fixing element 71 compressing on the pressure-adjusting element 7, the push member 5 and the color circle 53 on the top thereof are not upward pushed, as shown in FIG. 3. At this point, the color circle 53 is in contact with the shoulder portion 15 of the casing 1. A user may observe from outside of the transparent cover 8 the push member 5 and the color circle 53 at the low position and notice that the tire has insufficient tire pressure and must be checked or inflated.

Figure 4:
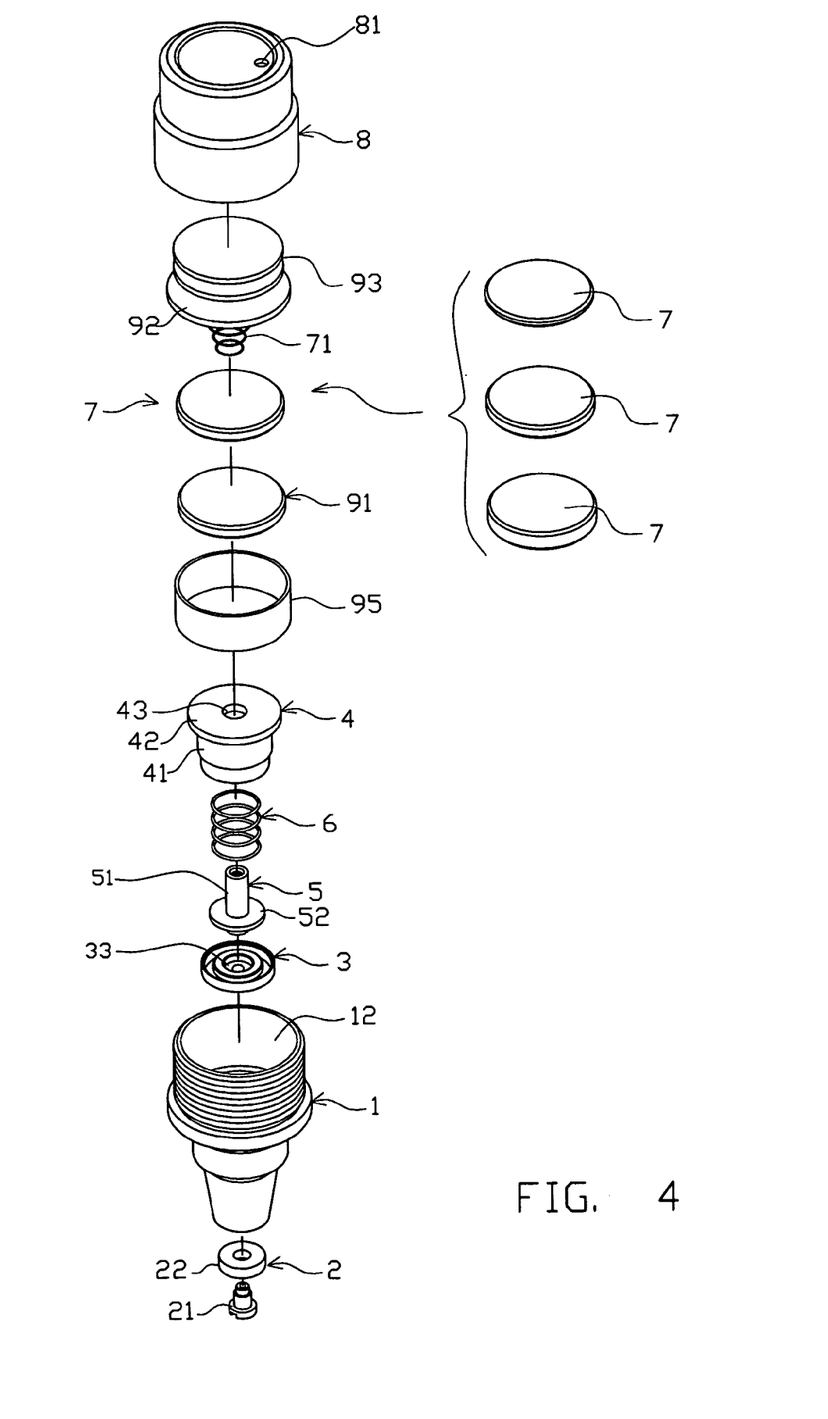
FIG. 4 is an exploded perspective view of a tire pressure warning device with adjustable tire pressure setting according to a second embodiment of the present invention.
Figure 5:
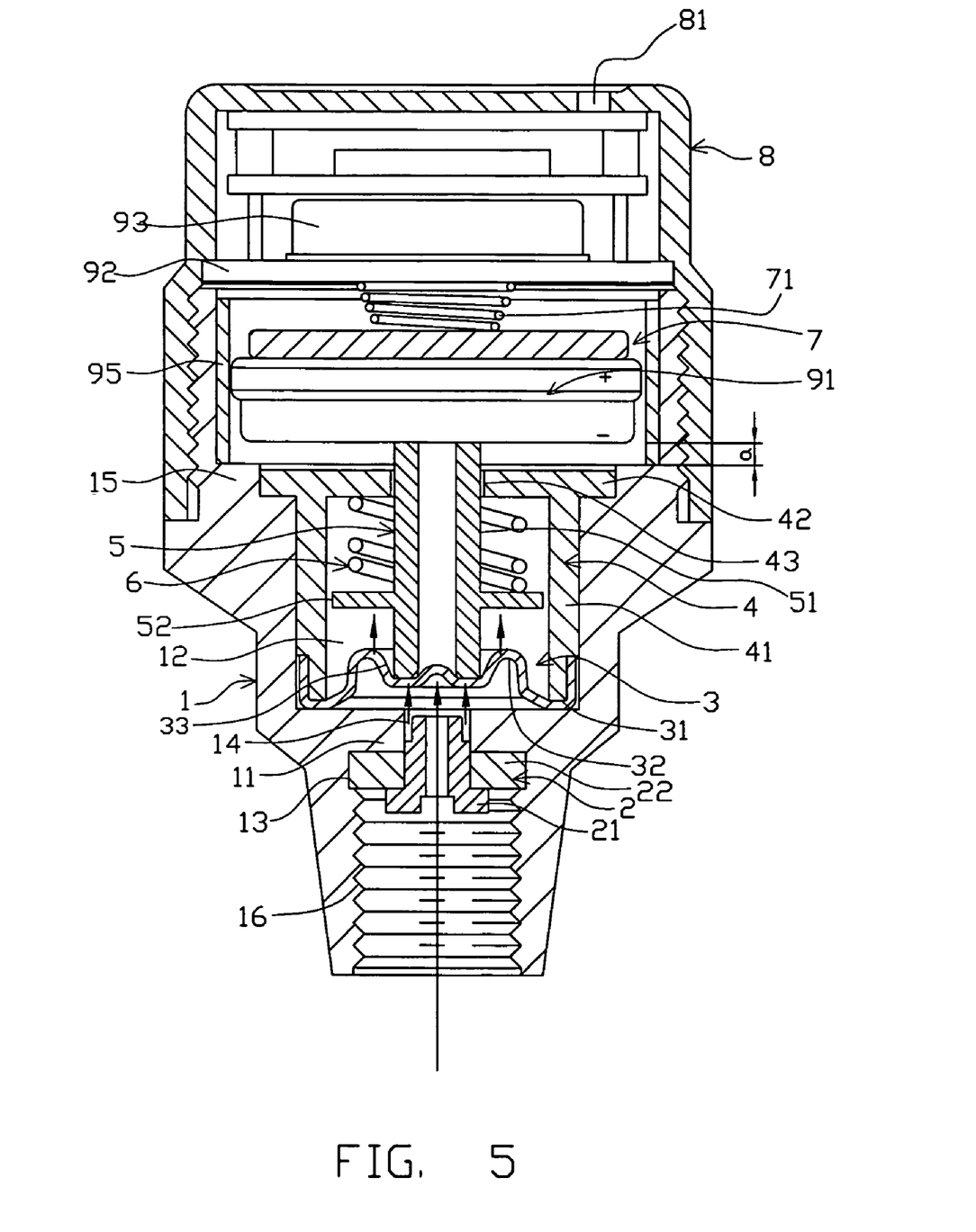
FIG. 5 is an assembled sectional view of the tire pressure warning device of FIG. 4 connected to a tire having a normal tire pressure.
Figure 6:
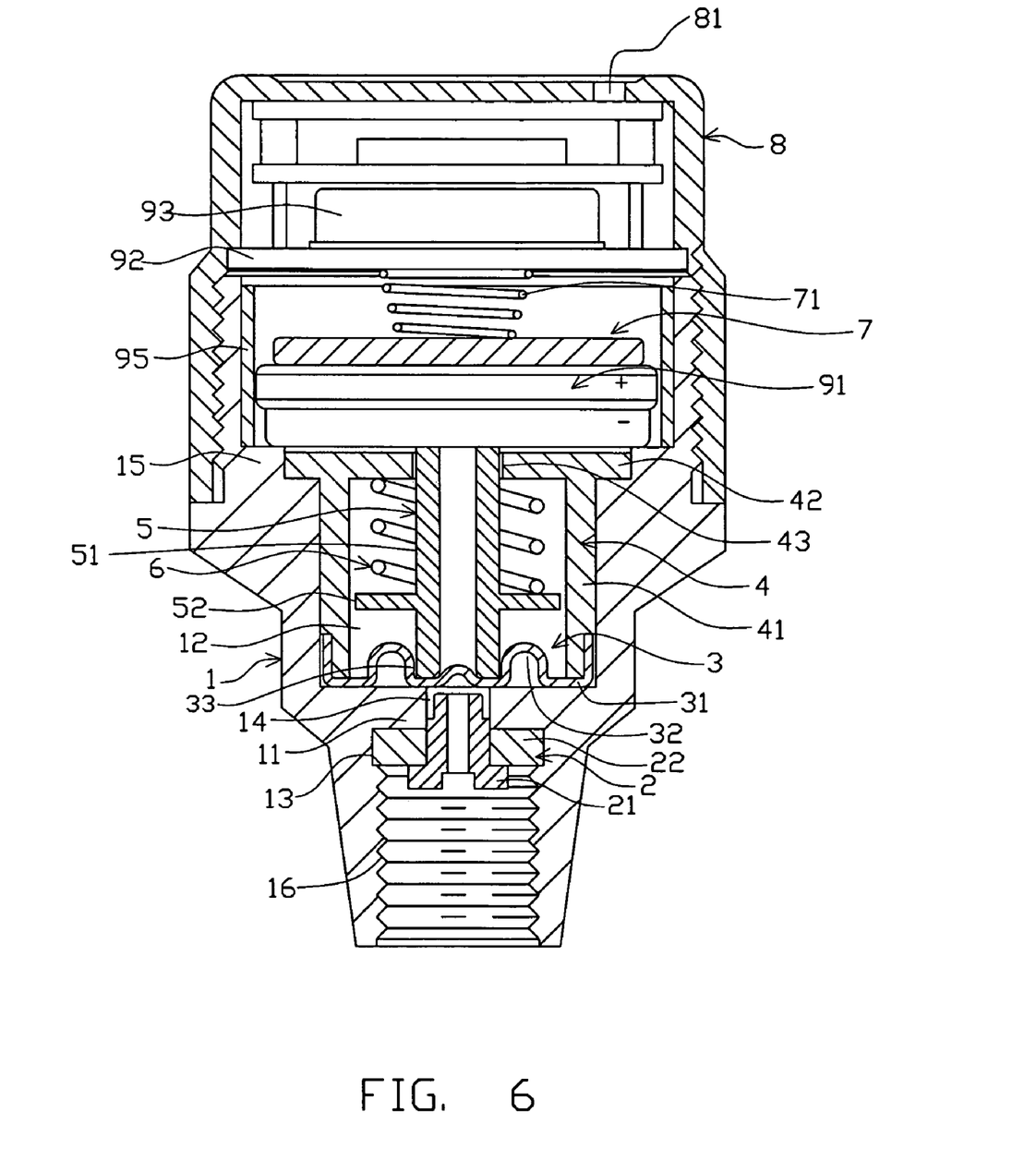
FIG. 6 is an assembled sectional view of the tire pressure warning device of FIG. 4 connected to a tire having an insufficient tire pressure.

Please refer to FIG. 4 that is an exploded perspective view of a tire pressure warning device with adjustable tire pressure setting according to a second embodiment of the present invention, and to FIGS. 5 and 6 that are assembled sectional views of the tire pressure warning device of FIG. 4 connected to tires having normal and insufficient tire pressures, respectively.

The tire pressure warning device of the second embodiment is generally structurally similar to the first embodiment, including a casing 1, a valve structure 2, a membrane 3, a bushing 4, a push member 5, an elastic element 6, a pressure-adjusting element 7, an elastic fixing element 71, and a cover 8. However, the second embodiment further includes a battery 91, a circuit board 92, and an emitter 93 mounted on the circuit board 92 for wirelessly emitting a signal representing the detected tire pressure to a receiving element, so as to warn a user of a current condition of the tire pressure.

It is to be noted that the casing 1 for the tire pressure warning device of the second embodiment is an electrically conductive casing, and that the pressure-adjusting element 7 and the elastic fixing element 71 are made of an electrically conductive material so as to enable transmission of electric signals of tire pressure via these conductive components.

The battery 91 and the elastic fixing element 71 are located above the push member 5. In an embodiment of the present invention, the pressure-adjusting element 7 is located between and in contact with the battery 91 and the elastic fixing element 71, and the battery 91 is rested on the shoulder portion 15 of the casing 1. In another embodiment of the present invention, the pressure-adjusting element 7 is located between and in contact with the battery 91 and the shoulder portion 15 of the casing 1, and the battery 91 has a top pressed against the elastic fixing element 71.

The circuit board 92 is located on and in contact with the top of the elastic fixing element 71 and the casing 1 to thereby electrically connect to the positive and negative electrodes of the battery 91. The emitter 93 mounted on the circuit board 92 emits a signal when the circuit board 92 is in a conducting state and supplies power to the emitter 93. The emitted signal is received by a receiver (not shown), which is usually mounted in a car at a position in sight of the driver, to warn the user of the current condition of the tire pressure.

Moreover, an insulating member 95 is positioned between the circumference of the pressure-adjusting element 7 and of the battery 91 and the inner wall surface of the casing 1 so as to avoid undesired lateral contact of the positive electrode with the negative electrode of the battery 91.

The tire pressure warning device of the second embodiment is used in the same manner as the first embodiment. A user first selects at least one pressure-adjusting element 7 with a suitable thickness corresponding to the pressure setting required by the tire, and positions the selected pressure-adjusting element 7 above the push member 5. Then, the tire pressure warning device could be used to detect the tire pressure.

When the air pressure inside the tire is sufficient and in a normal condition, the circular inner portion 32 of the membrane 3 is caused to protrude upward and deforms, and thereby upward pushes the push member 5, the pressure-adjusting element 7, and the battery 91, as shown in FIG. 5. At this point, the battery 91 is lifted up from the shoulder portion 15 of the casing, and one of the two electrodes, for example, the negative electrode, of the battery 91 is not electrically connected to the emitter 93. That is, the emitter 93 has an open power circuit and does not emit any signal. Therefore, the receiver does not receive any signal from the emitter, indicating the detected tire pressure is normal.

On the other hand, when the air pressure inside the tire is insufficient to resist the pressure setting determined via the elasticity of the elastic element 6 and the pressure-adjusting element 7, the push member 5 is not upward pushed, as shown in FIG. 6. At this point, the battery 91 on the top of the push member 5 keeps contacting with the shoulder portion 15 of the casing 1 and is electrically connected to the emitter 93. That is, the emitter 93 has a closed power circuit and emits a signal. When the receiver receives the signal emitted by the emitter 93, it actuates a warning light, for example, to warn the user that the tire has an insufficient tire pressure and must be checked or inflated.

Figure 7:
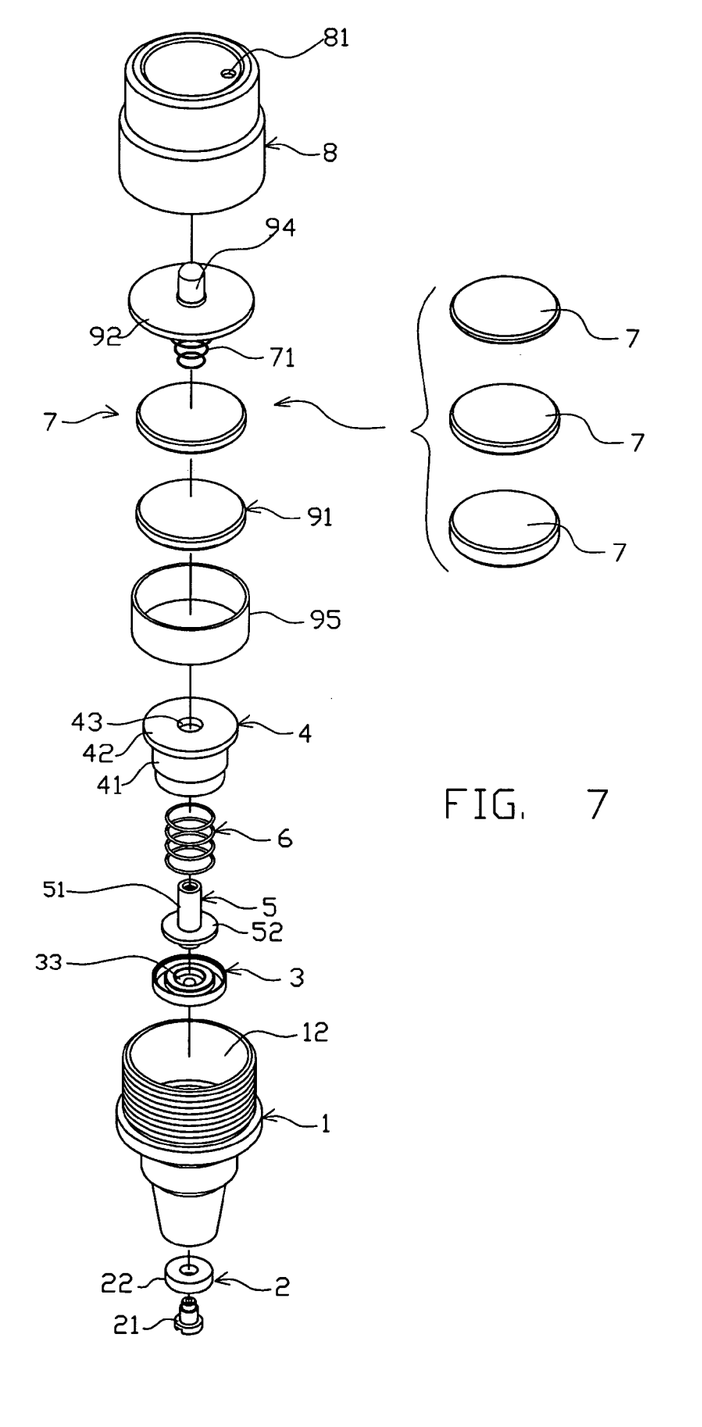
FIG. 7 is an exploded perspective view of a tire pressure warning device with adjustable tire pressure setting according to a third embodiment of the present invention.
Figure 8:
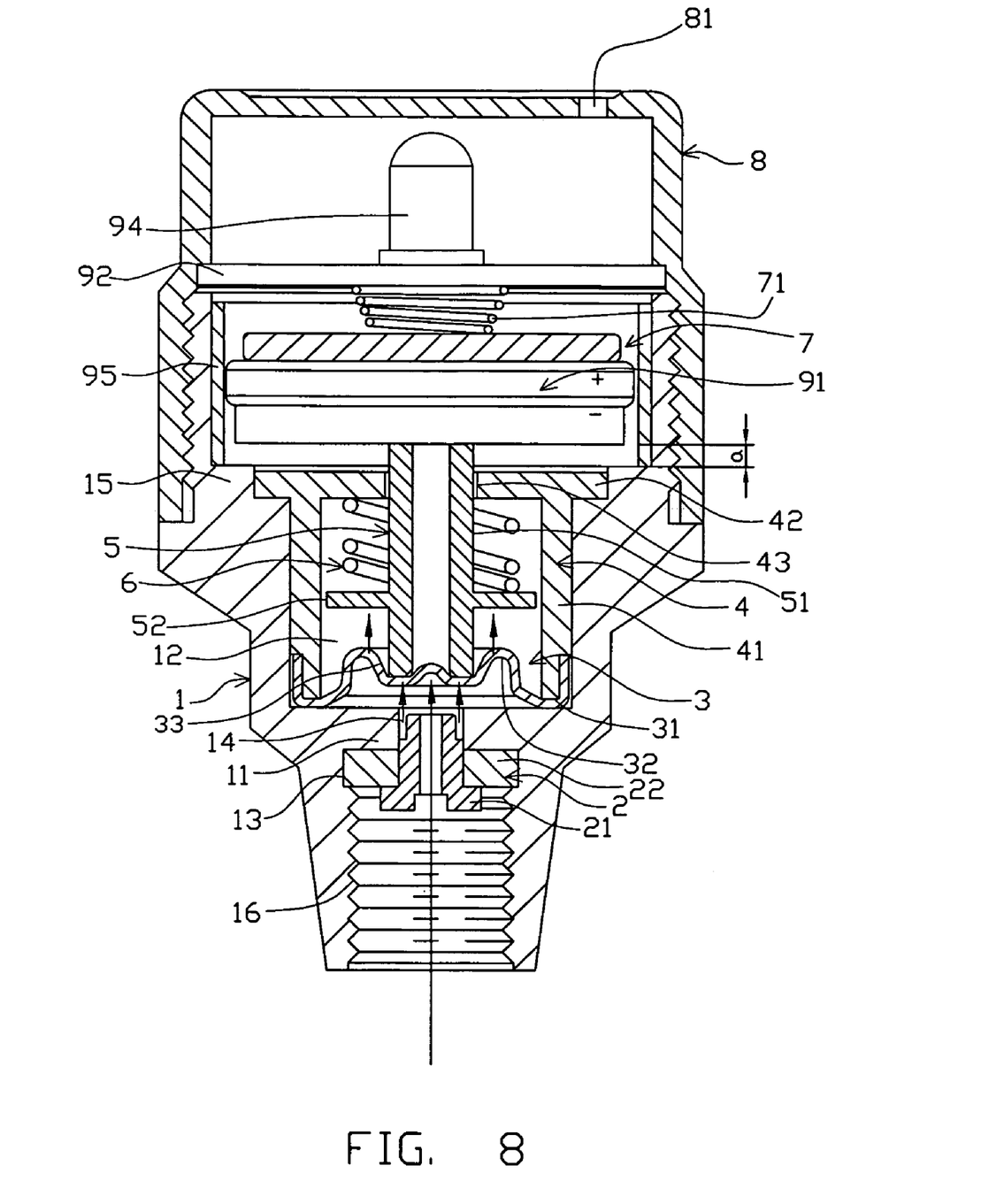
FIG. 8 is an assembled sectional view of the tire pressure warning device of FIG. 7 connected to a tire having a normal tire pressure.
Figure 9:
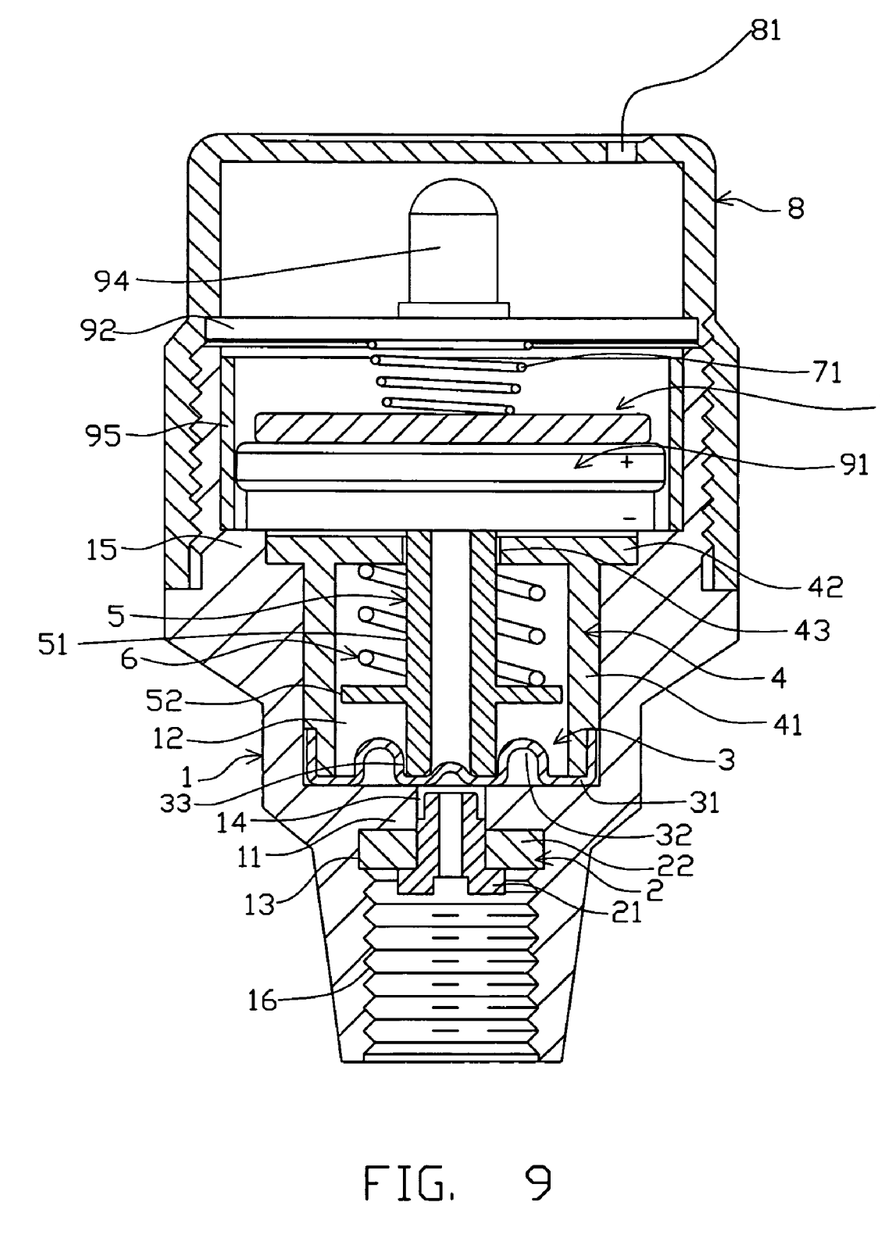
FIG. 9 is an assembled sectional view of the tire pressure warning device of FIG. 7 connected to a tire having an insufficient tire pressure.

Please refer to FIG. 7 that is an exploded perspective view of a tire pressure warning device with adjustable pressure setting according to a third embodiment of the present invention, and to FIGS. 8 and 9 that are assembled sectional views of the tire pressure warning device of FIG. 7 connected to tires having normal and insufficient tire pressures, respectively.

The tire pressure warning device of the third embodiment is generally structurally similar to the second embodiment, except that the third embodiment omits the emitter 93 and further includes a sound and flash warning device 94, such as a light-emitting diode (LED) and/or a buzzer, mounted on the circuit board 92 for warning a user of an insufficient tire pressure via sound and/or flashes.

The tire pressure warning device of the third embodiment is used in the same manner as the first and the second embodiment. A user first selects at least one pressure-adjusting element 7 with a suitable thickness corresponding to the pressure setting required by the tire, and positions the selected pressure-adjusting element 7 above the push member 5. Then, the tire pressure warning device could be used to measure the tire pressure.

When the air pressure inside the tire is sufficient and in a normal condition, the circular inner portion 32 of the membrane 3 is caused to protrude upward and deforms, and thereby upward pushes the push member 5, the pressure-adjusting element 7, and the battery 91, as shown in FIG. 8. At this point, the battery 91 is lifted up from the shoulder portion 15 of the casing 1, and one of the two electrodes, for example, the negative electrode, of the battery 91 is not electrically connected to the sound and flash warning means 94. That is, the sound and flash warning means 94 has an open power circuit and does not produce any sound or flash, indicating that the measured tire pressure is normal.

On the other hand, when the air pressure inside the tire is insufficient to resist the pressure setting determined via the elasticity of the elastic element 6 and the pressure-adjusting element 7, the push member 5 is not upward pushed, as shown in FIG. 9. At this point, the battery 91 on the top of the push member 5 keeps contacting with the shoulder portion 15 of the casing 1 and is electrically connected to the sound and flash warning means 94. That is, the sound and flash warning means 94 has a closed power circuit and produces sound and/or flashes to warn the user that the tire has insufficient tire pressure and must be checked or inflated.

With the above arrangements, a user may use the pressure-adjusting element 7 to adjust the pressure setting of the tire pressure warning device of the present invention, so that the same tire pressure warning device could be used to measure or detect different types of tires requiring different pressure settings. In other words, the tire pressure warning device of the present invention has a largely widened scope of application.

The present invention has been described with preferred embodiments and it is understood that many changes and modifications in the described embodiments can be carried out without departing from the scope and the spirit of the invention that is intended to be limited only by the appended claims.

What is claimed is:

1. A tire pressure warning device with adjustable tire pressure setting for being removably connected to a valve on a tire so as to show a warning signal when the tire has an insufficient tire pressure, comprising:
   a casing being internally provided with a transverse partition, having a central hole, to divide the inner space of said casing into an upper chamber and a lower chamber, and said upper chamber being provided at an inner side near the top thereof with an annular shoulder portion;

a valve structure mounted in said lower chamber of said casing;

a membrane mounted on the top of said transverse partition;

a bushing mounted in said upper chamber of said casing and located above an annular outer peripheral portion of said membrane, and being provided at the top with a through hole;

a push member including a push bar, said push bar being located in said bushing with a lower end of said push bar pressed against said membrane and an upper end upward projected from said through hole of said bushing; and said push bar being formed near the lower end with a radially extended flange;

an elastic element being mounted around said push bar of said push member and being located between said flange of said push member and the top of said bushing;

at least one pressure-adjusting element being mounted on the top of said push member;

a cover being provided at a predetermined position with a through hole, and mounted around the top of said casing; and an elastic fixing element for elastically positioning said at least one pressure-adjusting element between said push member and said cover.

2. The tire pressure warning device with adjustable tire pressure setting as claimed in claim 1, wherein said push bar is connected at the top with a color circle; said color circle having a bottom normally rested on said shoulder portion of said casing, and an outer surface coated with a warning color; and wherein said cover is made of a transparent material.

3. The tire pressure warning device with adjustable tire pressure setting as claimed in claim 2, wherein said at least one pressure-adjusting element is located between and in contact with said color circle and said elastic fixing element, and said elastic fixing element is pressed at its upper end against said cover.

4. The tire pressure warning device with adjustable tire pressure setting as claimed in claim 2, wherein said at least one pressure-adjusting element is located between and in contact with said cover and said elastic fixing element, and said elastic fixing element is pressed at its lower end against said color circle.

5. The tire pressure warning device with adjustable tire pressure setting as claimed in claim 2, wherein said color circle is fixedly riveted to the top of said push bar.

6. The tire pressure warning device with adjustable tire pressure setting as claimed in claim 2, wherein said color circle is adjustably screwed to the top of said push bar.

7. The tire pressure warning device with adjustable tire pressure setting as claimed in claim 1, wherein said elastic fixing element comprises an elastic body.

8. The tire pressure warning device with adjustable tire pressure setting as claimed in claim 1, wherein said valve structure includes a valve and a rubber washer mounted around said valve, and said valve having a top upward projected into and fixedly received in said central hole of said transverse partition in said casing.

9. The tire pressure warning device with adjustable tire pressure setting as claimed in claim 1, wherein said bushing includes a cylindrical body, and a flat top plate having a central through hole and located at the top of the cylindrical body.

10. The tire pressure warning device with adjustable tire pressure setting as claimed in claim 9, wherein said membrane is integrally molded to include an annular outer peripheral portion and a deformable circular inner portion surrounded by said outer peripheral portion; and said annular outer peripheral portion being firmly pressed downward by the bottom of said cylindrical body of said bushing.

11. The tire pressure warning device with adjustable tire pressure setting as claimed in claim 10, wherein said deformable circular inner portion of said membrane has a corrugated cross section.

12. The tire pressure warning device with adjustable tire pressure setting as claimed in claim 11, wherein said deformable circular inner portion of said membrane has a central area formed into an annular recess portion and said push bar is a tubular member; and wherein a lower end of said tubular push bar is pressed into said central annular recess portion of said membrane.

13. The tire pressure warning device with adjustable tire pressure setting as claimed in claim 1, further comprising a battery located above said push member; and a circuit board located on and in contact with the top of said elastic fixing element and said casing; and wherein said casing, said elastic fixing element, and said at least one pressure-adjusting element are electrically conductive.

14. The tire pressure warning device with adjustable tire pressure setting as claimed in claim 13, wherein said circuit board has an emitting means mounted thereon.

15. The tire pressure warning device with adjustable tire pressure setting as claimed in claim 13, wherein said circuit board has a sound and flash warning means mounted thereon.

16. The tire pressure warning device with adjustable tire pressure setting as claimed in claim 13, wherein said at least one pressure-adjusting element is located between and in contact with said battery and said elastic fixing element, and said battery is rested on said shoulder portion of said casing.

17. The tire pressure warning device with adjustable tire pressure setting as claimed in claim 13, wherein said at least one pressure-adjusting element is located between and in contact with said battery and said shoulder portion of said casing, and wherein said battery is pressed at the top against said elastic fixing element.

18. The tire pressure warning device with adjustable tire pressure setting as claimed in claim 13, further comprising an insulating member positioned between the circumference of said at least one pressure-adjusting element and said battery and an inner wall surface of said casing.

* * * * *